United States Patent
Wang (10) Patent No.: US 12,095,584 B2
(45) Date of Patent: Sep. 17, 2024

(54) BEARER CONFIGURATION METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 18/359,050

(22) Filed: Jul. 26, 2023

(65) Prior Publication Data

US 2023/0370299 A1  Nov. 16, 2023

Related U.S. Application Data

(63) Continuation of application No. PCT/CN2021/091695, filed on Apr. 30, 2021.

(51) Int. Cl.
- *H04L 12/18* (2006.01)
- *H04W 36/00* (2009.01)
- *H04W 76/27* (2018.01)
- *H04W 76/40* (2018.01)
- *H04W 4/06* (2009.01)

(52) U.S. Cl.
CPC ........ *H04L 12/189* (2013.01); *H04W 36/0007* (2018.08); *H04W 76/27* (2018.02); *H04W 76/40* (2018.02); *H04W 4/06* (2013.01)

(58) Field of Classification Search
CPC ...... H04L 12/189; H04W 76/27; H04W 4/06; H04W 76/40; H04W 16/32; H04W 36/0007; H04W 72/30
See application file for complete search history.

(56) References Cited

U.S. PATENT DOCUMENTS

| 10,728,812 B2 | 7/2020 | Kim |
| 2019/0230564 A1 | 7/2019 | Kim |
| 2021/0243834 A1 | 8/2021 | Wang |

(Continued)

FOREIGN PATENT DOCUMENTS

| CN | 111200852 A | 5/2020 |
| CN | 111866751 A | 10/2020 |
| EP | 3869859 A1 | 8/2021 |

(Continued)

OTHER PUBLICATIONS

International Search Report in the international application No. PCT/CN2021/091695, mailed on Dec. 27, 2021. 5 pages with English translation.

(Continued)

*Primary Examiner* — Nam T Huynh
(74) *Attorney, Agent, or Firm* — PERKINS COIE LLP (57) ABSTRACT

A bearer configuration method and apparatus, a terminal device and a network device are provided. The method comprises: a terminal device receives a bearer configuration instruction sent by a network device, the bearer configuration instruction being configured to configure an SRB 2 and at least one data bearer for the terminal device, wherein the at least one data bearer comprises at least one DRB and/or at least one MRB.

17 Claims, 3 Drawing Sheets

(56) References Cited

U.S. PATENT DOCUMENTS

2023/0124420 A1* 4/2023 Kim ............... H04W 36/0016
370/331

FOREIGN PATENT DOCUMENTS

| EP | 4120736 A1 | 1/2023 | |
|---|---|---|---|
| WO | 2020082248 A1 | 4/2020 | |
| WO | WO-2022124264 A1 * | 6/2022 | ........... H04L 12/189 |

OTHER PUBLICATIONS

Written Opinion of the International Search Authority in the international application No. PCT/CN2021/091695, mailed on Dec. 27, 2021. 9 pages with English translation.

3GPP TSG RAN Meeting #86 RP-193248, Sitges, Spain, Dec. 9-12, 2019, (revision of RP-193163), Source: Huawei, Title: New Work Item on NR support of Multicast and Broadcast Services , Document for: Approval, Agenda Item: 9.1.2. clean. 5 pages.

3GPP TSG RAN Meeting #86 RP-193248, Sitges, Spain, Dec. 9-12, 2019, (revision of RP-193163), Source: Huawei, Title: New Work Item on NR support of Multicast and Broadcast Services , Document for: Approval, Agenda Item: 9.1.2. marked up. 5 pages.

3GPP TS 38.331 V16.4.1 (Mar. 2021), 3rd Generation Partnership Project; Technical Specification Group Radio Access Network; NR; Radio Resource Control (RRC) protocol specification, (Release 16). 946 pages.

LG Electronics, "On RRC connection without DRV", 3GPP TSG-RAN WG2 Meeting #109 bis R2-2003598, E-meeting, Apr. 20-30, 2020, the whole document. 3 pages.

TCL Communication Ltd: Radio Bearer based Multicast PTM and PTP mode switching, 3GPP Draft; R2-2006569, 3RD Generation Partnership Project (3GPP), Mobilecompetence Centre ; 650, Route Des Lucioles ; E-06921 Sophia-Antipolis Cedex; France vol. Ran WG2, No. E-meeting; Aug. 17, 2020-Aug. 28, 2020, Aug. 7, 2020 (Aug. 7, 2020), XP052359695, sections 1-4, 5 pages.

"3rd Generation Partnership Project; Technical Specification Group Radio Access Network; NR; Radio Resource Control (RRC) protocol specification (Release 16)", 3GPP Standard; Technical Specification;3GPP TS 38.331, 3RD Generation Partnershipproject (3GPP), Mobile Competence Centre ;650, Route Des Lucioles ; E-06921 Sophia-Antipolis Cedex ; France vol. Ran WG2, No. V16.1.0, Jul. 24, 2020 (Jul. 24, 2020), XP051925836,section 5.3, in particular subsections 5.3.1, 5.3.3-5.3.5, 5.3.7-5.3.9, 902 pages.

"3rd Generation Partnership Project; Technical Specification Group Radio Access Network; Evolved Universal Terrestrial Radio Access (E-UTRA); Radio ResourceControl (RRC); Protocol specification (Release 16)", 3GPP Standard; Technical Specification;3GPP TS 36.331, 3RD Generation Partnershipproject (3GPP), Mobile Competence Centre :650, Route Des Lucioles ; r-06921 Sophia-Antipolis Cedex ; France vol. RAN WG2, No. V16.4.0, Mar. 30, 2021 (Mar. 30, 2021), XP052000242,section 5.3, 1084 pages.

Supplementary European Search Report in the European application No. 21938545.7, mailed on Mar. 5, 2024, 15 pages.

* cited by examiner

Transmitting, by a network device, a bearer configuration instruction to a terminal device; receiving, by the terminal device, the bearer configuration instruction transmitted by the network device, where the bearer configuration instruction configures an SRB2 and at least one data bearer for the terminal device, and the at least one data bearer comprises at least one of: at least one DRB or at least one MRB — 301

BEARER CONFIGURATION METHOD AND APPARATUS, TERMINAL DEVICE, AND NETWORK DEVICE

CROSS-REFERENCE TO RELATED APPLICATION

This is a continuation application of International Patent Application No. PCT/CN2021/091695, filed on Apr. 30, 2021, entitled "BEARER CONFIGURATION METHOD AND APPARATUS, TERMINAL DEVICE, AND NETWORK DEVICE", and the disclosure is hereby incorporated by reference in its entirety.

BACKGROUND

When receiving unicast service, the terminal device needs to enter a Radio Resource Control (RRC) connected status. When the terminal device is in the RRC connected status and there is a bearer for receiving a unicast service, a mobility process under the RRC connected status is supported.

With the introduction of Multimedia Broadcast Service (MBS), the terminal device also needs to enter the RRC connected status when receiving an MBS service in a multicast manner. In this case, how to support mobility under the RRC connected status needs to be clarified.

SUMMARY

Embodiments of the disclosure relate to the technical field of mobile communication, in particularly, to a bearer configuration method and apparatus, a terminal device and a network device.

The embodiments of the disclosure provide a bearer configuration method and apparatus, a terminal device and a network device.

A method for bearer configuration provided by the embodiment of the disclosure includes:
  receiving, by a terminal device, a bearer configuration instruction transmitted by a network device, where the bearer configuration instruction is used for configuring a Signaling Radio Bearer (SRB2) and at least one data bearer for the terminal device, and the at least one data bearer includes at least one of: at least one Data Radio Bearer (DRB) or at least one Multicast Radio Bearer (MRB).

A method for bearer configuration provided by the embodiment of the disclosure includes:
  transmitting, by a network device, a bearer configuration instruction to a terminal device, where the bearer configuration instruction is used for configuring a Signaling Radio Bearer (SRB2) and at least one data bearer for the terminal device, and the at least one data bearer includes at least one of: at least one Data Radio Bearer (DRB) or at least one Multicast Radio Bearer (MRB).

An apparatus for bearer configuration, applied to a terminal device, provided by the embodiment of the disclosure includes a processor and a memory. The memory is configured to store a computer program, and the processor is configured to call and run the computer program stored in the memory to perform an operation of:
  receiving a bearer configuration instruction transmitted by a network device, where the bearer configuration instruction is used for configuring a Signaling Radio Bearer (SRB2) and at least one data bearer for the terminal device, and the at least one data bearer includes at least one of: at least one Data Radio Bearer (DRB) or at least one Multicast Radio Bearer (MRB).

BRIEF DESCRIPTION OF THE DRAWINGS

The drawings described herein serve to provide a further understanding of and form a part of this disclosure. The schematic embodiments of this disclosure and their descriptions are used to explain the present disclosure and do not constitute an improper limitation of the present disclosure. In the drawings.

DETAILED DESCRIPTION

The technical solutions of the embodiments of the present disclosure will be described below in conjunction with the accompanying drawings in the embodiments of the present disclosure. It will be obvious that the described embodiments are part of the embodiments of the present disclosure, but not all embodiments. Based on the embodiments of the present disclosure, all other embodiments obtained by those of ordinary skill in the art without making creative efforts fall within the scope of protection of the present disclosure.

The technical solutions of the embodiments of the present disclosure can be applied to various communication systems, such as Long Term Evolution (LTE) system, LTE Frequency Division Duplex (FDD) system, LTE Time Division Duplex (TDD) system, 5G communication system or future communication systems, etc.

Figure 1:
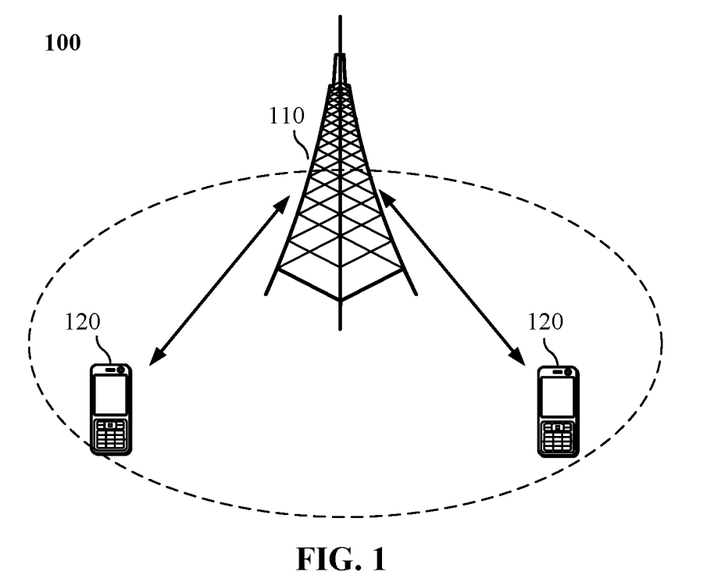
FIG. 1 is a schematic diagram of a communication system architecture provided by an embodiment of the present disclosure.

Exemplarily, a communication system 100 to which the embodiments of the present disclosure are applied is illustrated in FIG. 1. The communication system 100 may include a network device 110, which may be a device that communicates with a terminal 120 (or referred to as a communication terminal, and a terminal). The network device 110 may provide communication coverage for a specific geographic area and may communicate with terminals located within the coverage area. Optionally, the network device 110 may be an Evolutional Node B (eNB or eNodeB) in an LTE system, or a wireless controller in a Cloud Radio Access Network (CRAN), or the network device may be a mobile switching center, a relay station, an access point, an in-vehicle device, a wearable device, a hub, a switch, a bridge, a router, a network-side device in a 5G network, or a network device in future communication systems, etc.

The communication system 100 further includes at least one terminal 120 located within the coverage area of the network device 110. The "terminal" used herein includes, but is not limited to, an apparatus connected via a wire line, such as via a Public Switched Telephone Network (PSTN), a Digital Subscriber Line (DSL), a digital cable, a direct cable; and/or via another data connection/network; and/or via a wireless interface, for example, a cellular network, a Wireless Local Area Network (WLAN), a digital television network such as a DVB-H network, a satellite network, and an AM-FM broadcast transmitter; and/or a device, arranged to receive/transmit a communication signal, of another terminal; and/or Internet of Things (IoT) devices. A terminal arranged to communicate through a wireless interface may be referred to as a "wireless communication terminal", a "wireless terminal", or a "mobile terminal". Examples of mobile terminals include but are not limited to satellite or cellular phones; Personal Communications System (PCS) terminals that can combine cellular radio telephones with data processing, fax and data communication capabilities; PDA that may include radio telephones, pagers, Internet/Intranet access, Web browsers, notebooks, calendars, and/or Global Positioning System (GPS) receivers; and conventional laptop and/or handheld receivers or other electronic devices including radio telephone transceivers. The terminal may refer to an access terminal, user equipment (UE), a subscriber unit, a subscriber station, a mobile radio station, a mobile station, a remote station, a remote terminal, a mobile device, a user terminal, a terminal, a wireless communication device, a user agent, or a user device. The access terminal may be a cellular telephone, a cordless telephone, a Session Initiation Protocol (SIP) telephone, a Wireless Local Loop (WLL) station, a PDA, a handheld device with wireless communication functions, computing devices or other processing devices connected to wireless modems, in-vehicle devices, wearable devices, terminals in 5G networks or terminals in a future evolved PLMN, etc.

Optionally, Device to Device (D2D) communication may be performed between the terminals 120.

Optionally, the 5G communication system or 5G network may also be referred to as a New Radio (NR) system or an NR network.

FIG. 1 exemplarily illustrates one network device and two terminals. Optionally, the communication system 100 may include multiple network devices, and other numbers of terminals may be included within the coverage of each network device, which is not limited by the embodiments of the present disclosure.

Optionally, the communication system 100 may further include other network entities such as network controllers, mobility management entities and the like, which are not limited by the embodiments of the present disclosure.

It should be understood that a device having communication functions in a network/system in the embodiments of the present disclosure may be referred to as a communication device. Taking the communication system 100 illustrated in FIG. 1 as an example, the communication device may include a network device 110 and a terminal 120 having communication functions, and the network device 110 and the terminal 120 may be the specific devices described above and will not be described here. The communication device may further include other devices in the communication system 100, for example, other network entities such as network controllers and mobility management entities, which are not limited in the embodiments of the present disclosure.

It should be understood that the terms "system" and "network" are often used interchangeably herein. In this context, the term "and/or" is merely an association relationship that describes associated objects, representing that there can be three relationships. For example, A and/or B may represent that there are three situations: A exists alone, both A and B exist, and B exists alone. Furthermore, the character "/" herein generally represents that previous and next associated objects form an "or" relationship.

To facilitate understanding of the technical solutions of the embodiments of the present disclosure, the technical solutions related to the embodiments of the present disclosure are described below.

With people's pursuit of speed, delay, high-speed mobility and energy efficiency, as well as the diversity and complexity of service in future life, the International Standards Organization of the 3rd Generation Partnership Project (3GPP) began to develop 5G. The main application scenarios of 5G are enhanced Mobile Broadband (eMBB), Ultra-Reliable Low-Latency Communications (URLLC) and massive Machine-Type Communications (mMTC).

On the one hand, eMBB still aims at obtaining multimedia content, service and data for users, and its requirement is growing rapidly. On the other hand, since eMBB may be deployed in different scenarios, such as indoors, urban areas, rural areas, etc., and their capabilities and requirements are quite different, so it cannot be generalized and must be analyzed in detail in combination with specific deployment scenarios. Typical applications of URLLC include industrial automation, power automation, telemedicine operation (surgery), traffic safety assurance, etc. The typical characteristics of mMTC include high connection density, small data volume, delay-insensitive service, low cost and long service life of modules.

In the early deployment of NR, it is difficult to obtain complete NR coverage, so the typical network coverage is wide-area LTE coverage and NR island coverage mode. Moreover, a large number of LTE are deployed below 6 GHz, and there are few spectrum below 6 GHz available for 5G. Therefore, NR must study the spectrum application above 6 GHz, but the coverage of high frequency band is limited and the signal fades quickly. Moreover, in order to protect the early investment of mobile operators in LTE, a working mode of tight interworking between LTE and NR is proposed.

RRC Status

To reduce air interface signaling, quickly restore wireless connection and data service, 5G defines a new Radio Resource Control (RRC) status, that is, the RRC inactive (RRC_INACTIVE) status. This status is different from an RRC Idle (RRC_IDLE) status and an RRC Active (RRC_ACTIVE) status. Among them, 1) RRC_IDLE status (abbreviated as the idle status): mobility is reselected for cell selection based on UE, paging is initiated by Core Network (CN), and paging area is configured by the CN. There is no UE context and no RRC connection on the base station side.
2) RRC_CONNECTED status (abbreviated as a connected status): there is an RRC connection, and there is a UE context on both the base station side and the UE side. The network side knows that the location of the UE is at a specific cell level. Mobility is the mobility controlled by the network side. Unicast data may be transmitted between the UE and the base station.

3) RRC_INACTIVE status (abbreviated as the inactive status): mobility is reselected for cell selection based on UE, there is connection between CN and NR, there is UE context on a certain base station, paging is triggered by RAN, the RAN-based paging area is managed by the RAN, and network side knows that the location of the UE is at the RAN-based paging area level.

Multimedia Broadcast Multicast Service (MBMS)

MBMS is a technology that transmits data from one data source to multiple terminal devices by sharing network resources. MBMS can effectively utilize network resources while providing multimedia service, and realize broadcasting and multicast of multimedia service with high speed (such as 256 kbps).

Due to the low spectrum efficiency of MBMS, it is not enough to effectively carry and support the operations of mobile type service and TV type service. Therefore, in LTE, 3GPP explicitly proposes to enhance the support capability for downlink high-speed MBMS service and determines the design requirements for the physical layer and air interface.

3GPP R9 introduces evolved MBMS (eMBMS) into LTE. The eMBMS proposes the concept of Single Frequency Network (SFN), i.e., Multimedia Broadcast Multicast Service Single Frequency Network (MB SFN). MB SFN uses a unified frequency to transmit service data in all cells at the same time, but it has to ensure the synchronization between cells. This method can greatly improve the overall signal-to-noise ratio distribution of the cell, and the spectrum efficiency will be greatly improved accordingly. The eMBMS implements the broadcast and multicast of services based on IP multicast protocol.

In LTE or LTE-Advanced (LTE-A), MBMS has only broadcast bearer mode, but no multicast bearer mode. In addition, the reception of MBMS service is applicable to UE in the idle status or connected status.

The concept of Single Cell Point to Multipoint (SC-PTM) is introduced in 3GPP R13, where SC-PTM is based on MBMS network architecture.

MBMS introduces new logical channels including Single Cell-Multicast Control Channel (SC-MCCH) and Single Cell-Multicast Transport Channel (SC-MTCH). SC-MCCH and SC-MTCH are mapped to a Downlink-Shared Channel (DL-SCH), and moreover, DL-SCH is mapped to a Physical Downlink Shared Channel (PDSCH). SC-MCCH and SC-MTCH belong to a logical channel, DL-SCH belongs to a transmission channel, and PDSCH belongs to a physical channel. SC-MCCH and SC-MTCH do not support Hybrid Automatic Repeat ReQuest (HARM) operations.

MBMS introduces a new System Information Block (SIB) type, i.e., SIB20. Specifically, configuration information of the SC-MCCH is transmitted through the SIB 20 and there is only one SC-MCCH per cell. The configuration information of SC-MCCH includes the modification period of SC-MCCH, the repetition period of SC-MCCH, and the radio frame and subframe for scheduling SC-MCCH. Furthermore, 1) the boundary of the modification period of SC-MCCH satisfies SFN mod m=0, where SFN represents the system frame number of the boundary, and m is the modification period of SC-MCCH configured in SIB20 (i.e., sc-mcch-ModifationPeriod). 2) The radio frame for scheduling SC-MCCH satisfies SFN mod mcch-RepetitionPeriod=mcch-Offset, where SFN represents the system frame number of the radio frame, mcch-RepetitionPeriod represents the repetition period of SC-MCCH, and mcch-Offset represents the offset of SC-MCCH. 3) a subframe for scheduling SC-MCCH is indicated through sc-mcch-Subframe.

SC-MCCH is scheduled through Physical Downlink Control Channel (PDCCH). On the one hand, a new Radio Network Temporary Identity (RNTI), i.e., Single Cell RNTI (SC-RNTI), is introduced to identify PDCCH (such as SC-MCCH PDCCH) used for scheduling SC-MCCH. Optionally, the fixed value of SC-RNTI is FFFC. On the other hand, a new RNTI, i.e. Single Cell Notification RNTI (SC-N-RNTI), is introduced to identify PDCCH (e.g. Notification PDCCH) used for indicating change notification of SC-MCCH. Optionally, the fixed value of SC-N-RNTI is FFFB. Furthermore, a change notification may be indicated by one of eight bits of DCI 1C. In LTE, the configuration information of SC-PTM is based on SC-MCCH configured by SIB20, and then SC-MCCH is used to configure the SC-MTCH, which is used to transmit service data.

Specifically, SC-MCCH transmits only one message (i.e., SCPTMConfiguration), which is used to configure the configuration information of SC-PTM. The configuration information of SC-PTM includes Temporary Mobile Group Identity (TMGI), session id, Group RNTI (G-RNTI), Discontinuous Reception (DRX) configuration information and SC-PTM service information of adjacent cells, etc. It should be noted that SC-PTM in R13 does not support Robust Header Compression (ROHC) function.

Downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, a timer onDurationTimerSCPTM is started.

When the downlink PDCCH scheduling is received, a timer drx-InactivityTimerSCPTM is started.

Downlink SC-PTM service is received only when the timer onDurationTimerSCPTM or drx-InactivityTimerSCPTM is running.

SC-PTM service continuity adopts the concept of MBMS service continuity based on SIB15, i.e., in a "SIB15+MBMSInterestIndication" way. The service continuity of UE in the idle status is based on the concept of frequency priority.

It should be noted that although the above solutions is explained with MBMS, the description of "MBMS" can also be replaced by "MBS". Embodiments of the present disclosure are explained with MBS as an example, but the description of "MBS service" may also be replaced by "MBMS".

In NR system, many scenarios need to support the requirements for services with multicast and broadcast types, such as Internet of Vehicles and industrial Internet. Therefore, it is necessary to introduce MBS service with multicast and broadcast types into NR. It should be noted that the MBS service with a multicast type refers to the MBS service transmitted by multicast manner. MBS service with a broadcast type refers to MBS service transmitted by broadcasting manner.

In an NR system, for MBS service with a multicast type, MBS service is transmitted to all terminal devices in a certain group. The terminal device receives MBS service with a multicast type under the RRC connected status, and the terminal device may receive MBS service data with a multicast type through Point to Multipoint (PTM) manner or Point to Point (PTP) manner. The MBS service data of the PTM manner scrambles the corresponding scheduling information through the G-RNTI configured on the network side, and the MBS service data of the PTP manner scrambles the corresponding scheduling information through the C-RNTI.

Figure 2:
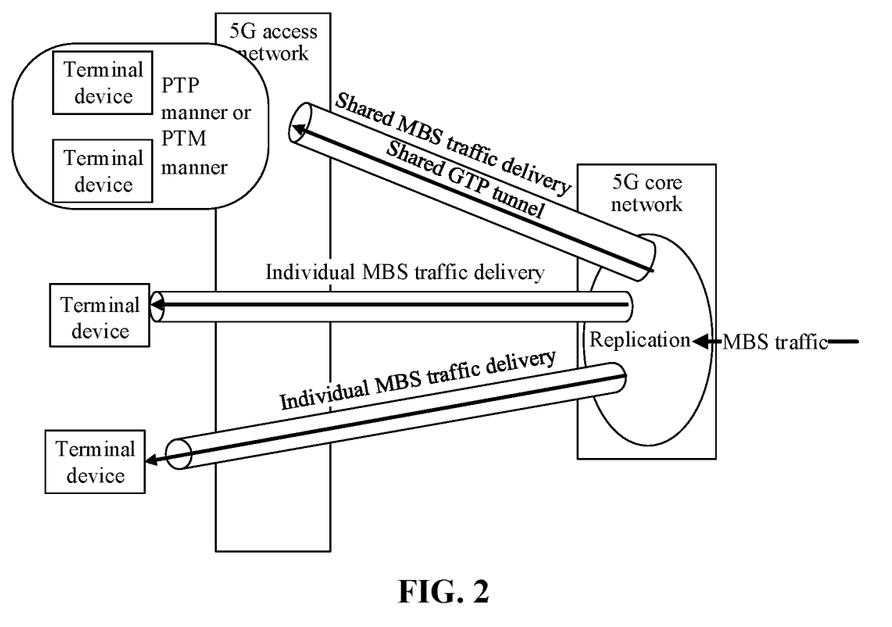
FIG. 2 is a transmission network architecture diagram of MBS service provided by an embodiment of the present disclosure.

MSB service is transmitted through a multicast manner, in other words, MSB service is MBS service with a multicast type. Specifically, after receiving the MBS service transmitted from the core network from a shared tunnel, the base station can distribute the MSB service to all terminal devices in a group through the air interface. Herein, the base station may distribute the MSB service to all the terminal devices in a group through the PTP manner and/or the PTM manner. For example, a group includes a terminal device 1, a terminal device 2 and a terminal device 3. The base station may distribute the MBS service to the terminal device 1 through the PTP manner, distribute the MBS service to the terminal device 2 through the PTP manner, and distribute the MBS service to the terminal device 3 through the PTP manner. Alternatively, the base station may distribute the MBS service to the terminal device 1 through the PTP manner, and distribute the MBS service to the terminal device 2 and the terminal device 3 through the PTM manner. Alternatively, the base station may distribute the MBS service to the terminal device 1, the terminal device 2 and the terminal device 3 through the PTM manner. Referring to FIG. 2, a shared GTP tunnel is used between the core network and the base station to transmit MBS service, that is, both the MBS service in the PTM manner and the MBS service in the PTP manner share this GTP tunnel. The base station distributes MBS service data to UE1 and UE2 according to the PTM manner, and distributes MBS service data to UE3 according to the PTP manner.

For a terminal device that receives an MBS service, other non-MBS services, such as eMBB service, are also received. Therefore, when no MBS service is transmitted, the terminal device can be released to an idle status or an inactive status or maintained in a connected status by the network side. In the case that the terminal device is in the idle status or inactive status, when the data of MBS service arrives, the network side can wake up the terminal device through paging to receive MBS services.

When the terminal device is in the RRC connected status and there is a bearer for receiving a unicast service, the terminal device supports a mobility process under the RRC connected status, such as a handover process, an RRC connection reestablishment process, and a process for requesting a terminal device context. With the introduction of MBS service, the terminal device needs to enter the RRC connected status when receiving a service. There are scenarios of receiving only MBS service but no unicast service, scenarios of receiving only unicast service but no MBS service, and scenarios of receiving MBS service and unicast service at the same time. In this case, how to support the mobility of terminal devices needs to be clarified.

Therefore, the following technical solutions of the embodiments of the disclosure are proposed.

Figure 3:
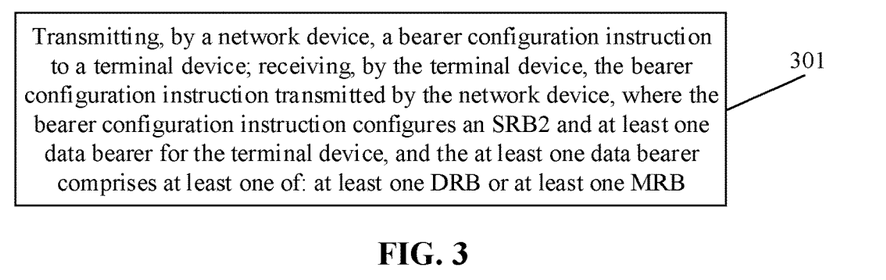
FIG. 3 is a schematic flow diagram of a method for bearer configuration provided by an embodiment of the present disclosure.

FIG. 3 is a schematic flow diagram of a method for bearer configuration provided by an embodiment of the present disclosure. As illustrated in FIG. 3, the method for bearer configuration includes the following operations.

At operation 301: a network device transmits a bearer configuration instruction to a terminal device, the terminal device receives the bearer configuration instruction transmitted by the network device. The bearer configuration instruction configures an SRB2 and at least one data bearer for the terminal device, and the at least one data bearer includes at least one of: at least one DRB or at least one MRB.

In some optional implementations of the present disclosure, the network device may be a base station.

In the embodiment of the present disclosure, the types of Radio Bearer (RB) can be divided into SRB, DRB and MRB. Among them, SRB belongs to the signaling bearer, DRB and MRB belong to the data bearer. Furthermore, the DRB is a bearer for the terminal device to receive the unicast service. The MRB is a bearer for the terminal device to receive the multicast service, where the multicast service refers to an MBS service in a multicast manner. The SRB is described below.

SRB is used to transmit the signaling. SRB0 is a default bearer, which already exists when the terminal device is in the RRC idle status or RRC inactive status. The RRC entity is the entity that manages the bearer, and completes the functions of setting up, modifying and releasing the bearer through the interaction of RRC signaling. Since SRB0 does not need to be set up, the terminal device may obtain the configuration and resources of SRB0 in the RRC idle status or RRC inactive status, and may use it directly when necessary. SRB1 can be set up by transmitting signaling on SRB0. After SRB1 is set up, the terminal device enters the RRC connected status, and then SRB2 is set up by transmitting signaling through SRB1, which is used to transmit non-access layer (NAS) signaling. Data bearer may also be set up by transmitting signaling through SRB1, which is used to transmit service data. In the process for service, the bearer is managed by SRB1. After the service ends, the signaling transmitted on SRB1 can release all of the data bearer and signaling bearer, so that the terminal device enters the RRC idle status. The only resource that the UE may use when needed is SRB0, and it needs to be performed after a random access is completed.

An RRC setup (RRC Setup) message is used to set up SRB1 and is carried in SRB0.

An RRC reconfiguration (RRCConfiguration) message is used to modify the RRC connection and is carried in SRB1.

It should be noted that after the access layer (AS) security is activated, the setup of SRB2 and data bearer is initiated. For the SRB2 and the DRB, E-UTRAN does not set up these bearers before the security is activated.

In the embodiment of the present disclosure, when the network device configures a bearer for the terminal device, the configuration of the bearer is performed by the network device under a certain configuration constraint. Herein, the configuration constraint is that the SRB2 and the data bearer have to be configured simultaneously. The network device cannot only configure one SRB2 or only configure at least one data bearer.

Based on this configuration constraint, a bearer configuration instruction transmitted by the network device to the terminal device is used for configuring an SRB2 and at least one data bearer for the terminal device. The at least one data bearer includes at least one DRB and/or at least one MRB. Herein, the terminal device is a terminal device in the RRC connected status, that is, SRB1 has been set up.

In the above solution, the bearer configuration instruction is RRC dedicated signaling. The bearer configuration instruction is carried in the SRB1.

In the embodiment of the present disclosure, due to the existence of the configuration constraint, when the network device releases the bearer, it also needs to follow the configuration constraint accordingly. Based on the configuration constraint, when all the at least one data bearer is released, the SRB2 is also released. Optionally, when the SRB2 is released, all of the at least one data bearer is also released. Optionally, furthermore, when the SRB2 and all of the at least one data bearer are released, the RRC connection is also released.

For example, when the network device releases the data bearer, if all the data bearers (such as the MRB and the DRB) of the terminal device are released, SRB2 also needs to be released. Furthermore, the RRC connection of the terminal device also needs to be released (that is, SRB1 is released).

In the embodiment of the present disclosure, after the terminal device is configured with the above bearer, the mobility process under the following multiple scenarios is supported.

Scenario 1: Switch Scenario

After the AS security has been activated, and after the SRB2 and the at least one data bearer are set up based on the bearer configuration instruction, the terminal device can receive a synchronous reconfiguration, where the synchronous reconfiguration is carried in the RRC reconfiguration message, and the at least one data bearer includes at least one of: at least one DRB or at least one MRB.

Herein, the synchronous reconfiguration is called "reconfigurationWithSync", where reconfigurationWithSync is included in the "masterCellGroup" configuration.

Herein, the masterCellGroup configuration is carried in the RRC reconfiguration (RRCConfiguration) message.

It should be noted that, in the above solution, after the SRB2 and the at least one data bearer are set up, it is further needed that the SRB2 and the at least one data bearer are not in a suspended status so that the terminal device can receive the synchronous reconfiguration.

The meaning of the above solution in the embodiment of the present disclosure can also refer to the contents of Table 1 below.

TABLE 1

The reconfigurationWithSync is included in masterCellGroup only when AS security has been activated, and SRB2 with at least one DRB or at least one MRB or, for IAB, SRB2, are setup and not suspended Scenario 2: RRC Connection Reestablishment Scenario After the AS security has been activated, and the SRB2 and the at least one data bearer are set up based on the bearer configuration instruction, the terminal device can trigger an RRC connection reestablishment process, where the at least one data bearer includes at least one of: at least one DRB or at least one MRB.

The meaning of the above solution in the embodiment of the present disclosure can also refer to the contents of Table 2 below.

TABLE 2

A UE in the RRC_CONNECTED, for which AS security has been activated with SRB2 and at last one DRB or at least one MRB setup or, for IAB, SRB2, may initiate the procedure in order to continue the RRC connection. The connection re-establishment succeeds if the network is able to find and verify a valid UE context or, if the UE context cannot be retrieved, and the network responds with an RRCSetup In some optional implementations of the present disclosure, the terminal device does not support the mobility process in the following scenario.

When the terminal device is configured with an MRB and is not configured with a DRB, the terminal device cannot receive a synchronous reconfiguration, where the synchronous reconfiguration is carried in an RRC reconfiguration message. When the terminal device is configured with an MRB and is not configured with a DRB, the terminal device cannot trigger an RRC connection reestablishment process.

Herein, when the terminal device only configures an MRB and no DRB, the terminal device does not support the process for receiving synchronous reconfiguration and triggering RRC connection reestablishment regardless of whether AS security is activated at this time. Herein, the synchronous reconfiguration is called "reconfigurationWithSync", where reconfigurationWithSync is included in the "masterCellGroup" configuration. The masterCellGroup configuration is carried in the RRC reconfiguration (RRCConfiguration) message.

Since the terminal device does not support the above mobility process, the terminal device directly enters the RRC idle status when a failure event occurs. As an example, the failure event includes at least one of the following: wireless link failure, RRC reconfiguration failure, or integrity protection verification failure.

In the technical solution in the embodiment of the disclosure, when introducing the MBS service in the multicast manner, the configuration constraint for the bearer and the behavior constraint for the terminal device are proposed, so that the MBS configuration is reasonable and effective.

Figure 4:
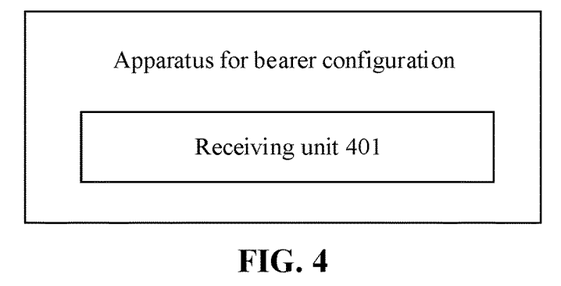
FIG. 4 is a first schematic diagram of the structural composition of an apparatus for bearer configuration provided by an embodiment of the present disclosure.

FIG. 4 is the first schematic diagram of the structural composition of an apparatus for bearer configuration, applied to a terminal device, provided by an embodiment of the present disclosure. As illustrated in FIG. 4, the apparatus for bearer configuration includes a receiving unit 401.

The receiving unit 401 is configured to receive a bearer configuration instruction transmitted by the network device. The bearer configuration instruction is used for configuring an SRB2 and at least one data bearer for the terminal device, and the at least one data bearer includes at least one of: at least one DRB or at least one MRB.

In some optional implementations of the present disclosure, the bearer configuration instruction is RRC dedicated signaling.

In some optional implementations of the present disclosure, after AS security has been activated, and the SRB2 and the at least one data bearer are set up based on the bearer configuration instruction, the terminal device can receive a synchronous reconfiguration. The synchronous reconfiguration is carried in an RRC reconfiguration message, and the at least one data bearer includes at least one of: at least one DRB or at least one MRB.

In some optional implementations of the present disclosure, after AS security has been activated, and the SRB2 and the at least one data bearer are set up based on the bearer configuration instruction, the terminal device can trigger an RRC connection reestablishment process. The at least one data bearer includes at least one of: at least one DRB or at least one MRB.

In some optional implementations of the present disclosure, when the terminal device is configured with an MRB and is not configured with a DRB, the terminal device is not capable of receiving a synchronous reconfiguration. The synchronous reconfiguration is carried in an RRC reconfiguration message.

In some optional implementations of the present disclosure, when the terminal device is configured with an MRB and is not configured with a DRB, the terminal device is not capable of triggering an RRC connection reestablishment process.

In some optional implementations of the present disclosure, the apparatus further includes a status control unit.

The status control unit is configured to control the terminal device to enter an RRC idle status when a failure event occurs.

In some optional implementations of the present disclosure, the failure event includes at least one of the following: wireless link failure, RRC reconfiguration failure, or integrity protection verification failure.

In some optional implementations of the present disclosure, when all of the at least one data bearer is released, the SRB2 is also released; or when the SRB2 is released, all of the at least one data bearer is also released.

In some optional implementations of the present disclosure, when the SRB2 and all of the at least one data bearer are released, an RRC connection is also released.

In some optional implementations of the present disclosure, the MRB is a bearer for the terminal device to receive a multicast service.

Those skilled in the art will appreciate that the above-mentioned description of the bearer configuration apparatus in the embodiment of the present disclosure may be understood with reference to the description of the bearer configuration method in the embodiment of the present disclosure.

Figure 5:
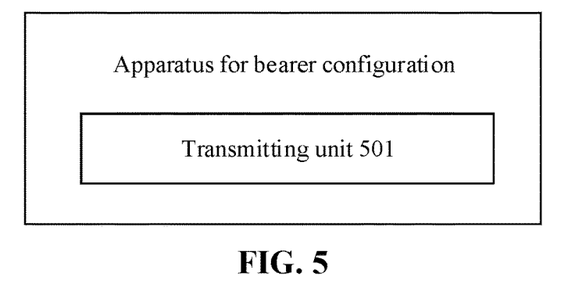
FIG. 5 is a second schematic diagram of the structural composition of an apparatus for bearer configuration provided by an embodiment of the present disclosure.

FIG. 5 is the second schematic diagram of the structural composition of an apparatus for bearer configuration, applied to a network device, provided by an embodiment of the present disclosure. As illustrated in FIG. 5, the apparatus for bearer configuration includes a transmitting unit 501.

The transmitting unit 501 is configured to transmit a bearer configuration instruction to the terminal device. The bearer configuration instruction is used for configuring an SRB2 and at least one data bearer for the terminal device, and the at least one data bearer includes at least one of: at least one DRB or at least one MRB.

In some optional implementations of the present disclosure, the bearer configuration instruction is RRC dedicated signaling.

In some optional implementations of the present disclosure, when all of the at least one data bearer is released, the SRB2 is also released; or when the SRB2 is released, all of the at least one data bearer is also released.

In some optional implementations of the present disclosure, when the SRB2 and all of the at least one data bearer are released, an RRC connection is also released.

In some optional implementations of the present disclosure, the MRB is a bearer for the terminal device to receive a multicast service.

Those skilled in the art will appreciate that the above-mentioned description of the apparatus for bearer configuration in the embodiment of the present disclosure may be understood with reference to the description of the method for bearer configuration in the embodiment of the present disclosure.

Figure 6:
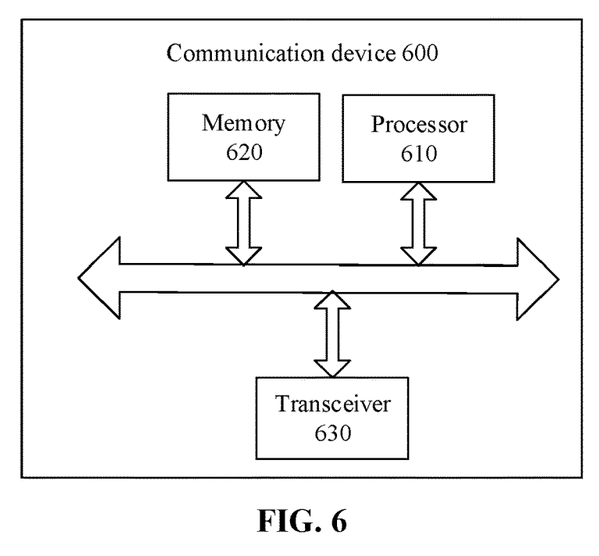
FIG. 6 is a schematic structural diagram of a communication device provided by an embodiment of the present disclosure.

FIG. 6 is a schematic structural diagram of a communication device 600 provided by an embodiment of the present disclosure. The communication device may be a terminal device or a network device, and the communication device 600 illustrated in FIG. 6 includes a processor 610 that may call and run a computer program in memory to implement the methods in the embodiments of the present disclosure.

Optionally, as illustrated in FIG. 6, the communication device 600 may also include a memory 620. The processor 610 may call and run a computer program in memory 620 to implement the methods in the embodiments of the present disclosure.

The memory 620 may be a separate device independent of the processor 610 or may be integrated in the processor 610.

Optionally, as illustrated in FIG. 6, the communication device 600 may also include a transceiver 630. The processor 610 may control the transceiver 630 to communicate with other devices, and specifically, may transmit information or data to other devices, or receive information or data transmitted by other devices.

The transceiver 630 may include a transmitter and a receiver. The transceiver 630 may further include antennas, the number of which may be one or more.

Optionally, the communication device 600 may be specifically a network device of the embodiment of the present disclosure, and the communication device 600 may implement corresponding processes implemented by the network device in the respective methods of the embodiments of the present disclosure, which will not be repeated here for brevity.

Optionally, the communication device 600 may be specifically a mobile terminal/terminal device of the embodiment of the present disclosure, and the communication device 600 may implement corresponding processes implemented by the mobile terminal/terminal device in the respective methods of the embodiments of the present disclosure, which will not be repeated herein for brevity.

Figure 7:
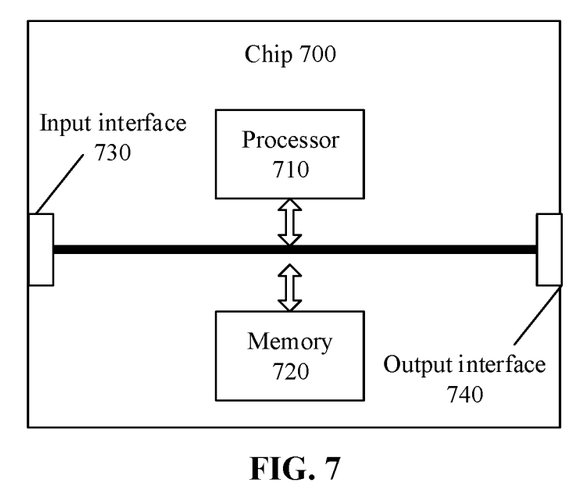
FIG. 7 is a schematic structural diagram of a chip provided by an embodiment of the present disclosure.

FIG. 7 is a schematic structural diagram of a chip provided by an embodiment of the present disclosure. The chip 700 illustrated in FIG. 7 includes a processor 710 that can call and run a computer program in memory to implement the methods in the embodiments of the present disclosure.

Optionally, as illustrated in FIG. 7, the chip 700 may further include a memory 720. The processor 710 may call and run a computer program in the memory 720 to implement the methods in the embodiments of the present disclosure.

The memory 720 may be a separate device independent of the processor 710 or may be integrated in the processor 710.

Optionally, the chip 700 may further include an input interface 730. The processor 710 may control the input interface 730 to communicate with other devices or chips, and specifically, may obtain information or data transmitted by other devices or chips.

Optionally, the chip 700 may further include an output interface 740. The processor 710 may control the output interface 740 to communicate with other devices or chips, and specifically, may output information or data to other devices or chips.

Optionally, the chip can be applied to the network device in the embodiment of the present disclosure, and the chip can implement the corresponding processes implemented by the network device in the respective methods of the embodiments of the present disclosure, which will not be repeated herein for brevity.

Optionally, the chip can be applied to the mobile terminal/terminal device in the embodiment of the present application, and the chip can implement the corresponding processes implemented by the mobile terminal/terminal device in the respective methods of the embodiments of the present disclosure, which will not be repeated herein for brevity.

It should be understood that the chip in the embodiments of the present disclosure may also be referred to as a system-level chip, system chip, chip system or system-on-chip (SoC) or the like.

Figure 8:
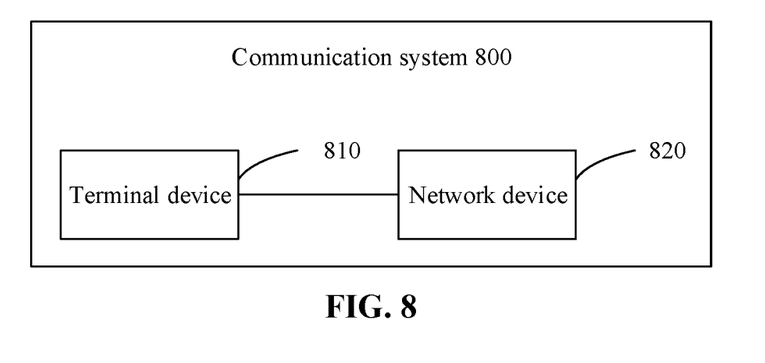
FIG. 8 is a schematic block diagram of a communication system provided by an embodiment of the present disclosure.

FIG. 8 is a schematic block diagram of a communication system 800 provided by an embodiment of the present disclosure. As illustrated in FIG. 8 the communication system 800 includes a terminal device 810 and a network device 820.

The terminal device 810 may be configured to implement the corresponding functions implemented by the terminal device in the above-mentioned method, and the network device 820 may be configured to implement the corresponding functions implemented by the network device in the above-mentioned method, which will not repeated herein for brevity.

It should be understood that the processor of the embodiments of the present disclosure may be an integrated circuit chip with signal processing capability. In the implementation process, the operations of the above method embodiments may be accomplished by integrated logic circuit of hardware or instructions in the form of software in the processor. The processor may be a general purpose processor, a Digital Signal Processor (DSP), an Application Specific Integrated Circuit (ASIC), a Field Programmable Gate Array (FPGA) or other programmable logic devices, discrete gates or transistor logic devices, or discrete hardware components. The methods, operations and logic block diagrams disclosed in embodiments of the present disclosure may be implemented or executed. The general purpose processor may be a microprocessor or the processor may be any conventional processor or the like. The operations of the method disclosed in combination with the embodiments of the present disclosure may be directly embodied as the execution of the hardware decoding processor or the combined execution of the hardware and software modules in the decoding processor. The software module may be located in Random access memory (RAM), flash memory, read-only memory, programmable read-only memory or electrically erasable programmable memory, registers and other storage media mature in the art. The storage medium is located in the memory, and the processor reads the information in the memory and completes the operations of the method in combination with its hardware.

It should be understood that the memory in the embodiments of the present disclosure may be volatile memory or non-volatile memory or may include both volatile and non-volatile memory. The nonvolatile memory may be Read-Only Memory (ROM), Programmable ROM (PROM), Erasable PROM (EPROM), Electrically Erasable EPROM (EEPROM), or flash memory. The volatile memory may be a Random Access Memory (RAM), which serves as an external cache. By way of illustration but not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous connected dynamic random access memory (SLDRAM), and Direct Rambus RAM (DR RAM). It should be noted that the memory of the systems and methods described herein is intended to include but not limited to these and any other suitable types of memory.

It should be understood that the memory described above is exemplary but not limitation. For example, the memory in the embodiments of the present disclosure may also be SRAM, DRAM, SDRAM, DDR SDRAM, ESDRAM, SLDRAM, DR RAM, etc. That is, the memory in the embodiments of the present disclosure is intended to include but not limited to these and any other suitable types of memory.

The embodiment of the disclosure also provides a computer readable storage medium for storing a computer program.

Optionally, the computer-readable storage medium may be applied to the network device in the embodiment of the present disclosure, and the computer program enables the computer to execute the corresponding processes implemented by the network device in the respective methods of the embodiments of the present disclosure, which will not be repeated herein for brevity.

Optionally, the computer-readable storage medium may be applied to the mobile terminal/terminal device in the embodiment of the present disclosure, and the computer program enables the computer to execute corresponding processes implemented by the mobile terminal/terminal device in the respective methods of the embodiments of the present disclosure, which will not be repeated herein for brevity.

The embodiment of the disclosure also provides a computer program product including computer program instructions.

Optionally, the computer program product may be applied to the network device in the embodiment of the present disclosure, and the computer program instructions enables the computer to execute the corresponding processes implemented by the network device in the respective methods of the embodiments of the present disclosure, which will not be repeated herein for brevity.

Optionally, the computer program product may be applied to the mobile terminal/terminal device in the embodiment of the present disclosure, and the computer program instructions enable the computer to execute the corresponding processes implemented by the mobile terminal/terminal device in the respective methods of the embodiments of the present disclosure, which is not repeated herein for brevity.

The embodiment of the disclosure also provides a computer program.

Optionally, the computer program may be applied to the network device in the embodiment of the present disclosure. When the computer program is running on the computer, the computer executes the corresponding processes implemented by the network device in the respective methods of the embodiments of the present disclosure, which will not be repeated herein for brevity.

Optionally, the computer program may be applied to the mobile terminal/terminal device in the embodiment of the present disclosure. When the computer program is running on the computer, the computer executes the corresponding processes implemented by the mobile terminal/terminal device in the respective methods of the embodiments of the present disclosure, which will not be repeated herein for brevity.

Those of ordinary skill in the art will appreciate that the units and algorithm steps of various embodiments described in connection with the embodiments disclosed herein can be implemented in electronic hardware or a combination of computer software and electronic hardware. Whether these functions are performed in hardware or software depends on the specific application and design constraints of the technical scheme. Professional technicians may use different methods to implement the described functionality for each specific application, but such implementations should not be considered to be beyond the scope of the present disclosure.

Those skilled in the art will clearly appreciate that, for convenience and conciseness of description, the specific operating processes of the above-described systems, apparatuses and units may refer to the corresponding processes in the aforementioned method embodiments and will not be repeated herein.

In several embodiments provided herein, it should be understood that the disclosed systems apparatuses and methods may be implemented in other ways. For example, the above-described embodiments of the apparatus are only schematic. For example, the division of the unit is only a logical function division. There may be another division manner in actual implementation, for example, multiple units or components may be combined or integrated into another system, or some features may be ignored or not performed. On the other hand, the mutual coupling or direct coupling or communication connection illustrated or discussed may be indirect coupling or communication connection through some interface, devices or units, and may be electrical, mechanical or other forms.

The unit illustrated as separate components may or may not be physically separated, and the component displayed as a unit may or may not be a physical unit, that is, it may be located in one place, or may be distributed over a plurality of network units. Some or all of the units can be selected according to the actual needs to achieve the purpose of the embodiments.

In addition, each functional unit in each embodiment of the present disclosure may be integrated into one processing unit, each unit may exist physically separate, or two or more units may be integrated into one unit.

The functions may be stored in a computer readable storage medium if the functions are implemented in the form of software functional units and sold or used as independent products. Based on this understanding, the technical solutions of the present disclosure may essentially be embodied in the form of a software product, or the part that contributes to the related art or the part of the technical solution may be embodied in the form of a software product, which is stored in a storage medium, including instructions for causing a computer device (which may be a personal computer, a server, a network device, etc.) to perform all or part of the operations of the method described in various embodiments of the present disclosure. The aforementioned storage medium includes a USB flash disk, mobile hard disk, ROM, Random Access Memory (RAM), a magnetic disk or an optical disk and other medium capable of storing program codes.

The above-mentioned is only the specific implementation of the present disclosure, but the scope of protection of the present disclosure is not limited this. The changes or replacements within the technical scope disclosed in the present disclosure easily performed by any technical personnel familiar with the technical field shall be covered by the protection scope of the present disclosure. Therefore, the protection scope of this disclosure shall be subject to the scope of protection of the claims.

What is claimed is:

1. A method for bearer configuration, comprising:
   receiving, by a terminal device, a bearer configuration instruction transmitted by a network device, wherein the bearer configuration instruction is used for configuring a Signaling Radio Bearer (SRB2) and at least one data bearer for the terminal device, and the at least one data bearer comprises at least one of: at least one Data Radio Bearer (DRB) or at least one Multicast Radio Bearer (MRB);
   wherein the method further comprises:
   after Access Stratum (AS) security has been activated, and the SRB2 and the at least one data bearer are set up based on the bearer configuration instruction, receiving, by the terminal device, a synchronous reconfiguration, wherein the synchronous reconfiguration is carried in an Radio Resource Control (RRC) reconfiguration message, and the at least one data bearer comprises at least one of: at least one DRB or at least one MRB;
   wherein the method further comprises:
   when the terminal device is configured with an MRB and is not configured with a DRB, not receiving, by the terminal device, the synchronous reconfiguration, wherein the synchronous reconfiguration is carried in the RRC reconfiguration message.

2. The method of claim 1, wherein the bearer configuration instruction is RRC dedicated signaling.

3. The method of claim 1, wherein the method further comprises:
   after AS security has been activated, and the SRB2, and the at least one data bearer are set up based on the bearer configuration instruction, triggering, by the terminal device, an RRC connection reestablishment process, wherein the at least one data bearer comprises at least one of: at least one DRB or at least one MRB.

4. The method of claim 1, wherein the method further comprises:
   when the terminal device is configured with an MRB and is not configured with a DRB, not triggering, by the terminal device, an RRC connection reestablishment process.

5. The method of claim 4, wherein the method further comprises:
   when a failure event occurs, the terminal device enters an RRC idle status.

6. The method of claim 5, wherein the failure event comprises at least one of:
   wireless link failure, RRC reconfiguration failure, or integrity protection verification failure.

7. The method of claim 1, wherein
   when all of the at least one data bearer is released, the SRB2 is also released; or when the SRB2 is released, all of the at least one data bearer is also released.

8. The method of claim 7, wherein when the SRB2 and all of the at least one data bearer are released, an RRC connection is also released.

9. The method of claim 1, wherein the MRB is a bearer for the terminal device to receive a multicast service.

10. A method for bearer configuration, comprising:
    transmitting, by a network device, a bearer configuration instruction to a terminal device, wherein the bearer configuration instruction is used for configuring a Signaling Radio Bearer (SRB2) and at least one data bearer for the terminal device, and the at least one data bearer comprises at least one of: at least one Data Radio Bearer (DRB) or at least one Multicast Radio Bearer (MRB),
    wherein the network device further transmits an Radio Resource Control (RRC) reconfiguration message carrying a synchronous reconfiguration, the synchronous reconfiguration is received by the terminal device after Access Stratum (AS) security has been activated and the SRB2 and the at least one data bearer are set up based on the bearer configuration instruction; and the at least one data bearer comprises at least one of: at least one DRB or at least one MRB,
    wherein when the terminal device is configured with an MRB and is not configured with a DRB, the synchronous reconfiguration is not received by the terminal device, wherein the synchronous reconfiguration is carried in the RRC reconfiguration message.

11. The method of claim 10, wherein the bearer configuration instruction is RRC dedicated signaling.

12. The method of claim 10, wherein
when all of the at least one data bearer is released, the SRB2 is also released; or
when the SRB2 is released, all of the at least one data bearer is also released.

13. The method of claim 12, wherein when the SRB2 and all of the at least one data bearer are released, an RRC connection is also released.

14. The method of claim 10, wherein the MRB is a bearer for the terminal device to receive a multicast service.

15. An apparatus for bearer configuration, applied to a terminal device, the apparatus comprising a processor and a memory, wherein the memory is configured to store a computer program, and the processor is configured to call and run the computer program stored in the memory to perform an operation of:
receiving a bearer configuration instruction transmitted by a network device, wherein the bearer configuration instruction is used for configuring a Signaling Radio Bearer (SRB2) and at least one data bearer for the terminal device, and the at least one data bearer comprises at least one of: at least one Date Radio Bearer (DRB) or at least one Multicast Radio Bearer (MRB),
wherein after Access Stratum (AS) security has been activated, and the SRB2 and the at least one data bearer are set up based on the bearer configuration instruction, the terminal device receives a synchronous reconfiguration, wherein the synchronous reconfiguration is carried in an Radio Resource Control (RRC) reconfiguration message, and the at least one data bearer comprises at least one of: at least one DRB or at least one MRB,
wherein when the terminal device is configured with an MRB and is not configured with a DRB, the synchronous reconfiguration is not received by the terminal device, wherein the synchronous reconfiguration is carried in the RRC reconfiguration message.

16. The apparatus of claim 15, wherein the bearer configuration instruction is RRC dedicated signaling.

17. The apparatus of claim 15, wherein after AS security has been activated, and the SRB2 and the at least one data bearer are set up based on the bearer configuration instruction, the terminal device triggers an RRC connection reestablishment process, wherein the at least one data bearer comprises at least one of: at least one DRB or at least one MRB.

* * * * *